(12) United States Patent
Camunas Garciamiguel et al.

(10) Patent No.: US 12,355,247 B2
(45) Date of Patent: Jul. 8, 2025

(54) SYSTEMS AND METHODS FOR POWER VARIABILITY REDUCTION

(71) Applicant: Siemens Gamesa Renewable Energy Innovation & Technology S.L., Navarra (ES)

(72) Inventors: Pedro Luis Camunas Garciamiguel, Madrid (ES); Manuel Garcia Plaza, Madrid (ES); Jesus Lopez Merino, Madrid (ES); Andrés Peña Asensio, Madrid (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 4 days.

(21) Appl. No.: 18/278,796

(22) PCT Filed: Feb. 17, 2022

(86) PCT No.: PCT/EP2022/054007
§ 371 (c)(1),
(2) Date: Aug. 24, 2023

(87) PCT Pub. No.: WO2022/184465
PCT Pub. Date: Sep. 9, 2022

(65) Prior Publication Data
US 2024/0213779 A1   Jun. 27, 2024

(30) Foreign Application Priority Data
Mar. 1, 2021 (EP) .................................. 21382172

(51) Int. Cl.
*H02J 3/24* (2006.01)
*H02J 3/38* (2006.01)
*H02J 7/00* (2006.01)

(52) U.S. Cl.
CPC .............. *H02J 3/241* (2020.01); *H02J 3/381* (2013.01); *H02J 7/00712* (2020.01);
(Continued)

(58) Field of Classification Search
CPC ....................................................... H02J 3/241
(Continued)

(56) References Cited

U.S. PATENT DOCUMENTS

| 2012/0038212 A1* | 2/2012 | Arata | H02J 7/0016 |
| | | | 320/128 |
| 2013/0140820 A1* | 6/2013 | Tarnowski | F03D 7/042 |
| | | | 290/44 |
| 2015/0194820 A1 | 7/2015 | Liang et al. | |

FOREIGN PATENT DOCUMENTS

| EP | 3026774 A1 | 8/1989 |
| EP | 3161931 B1 | 3/2019 |

(Continued)

OTHER PUBLICATIONS

PCT International Search Report and Written Opinion of International Searching Authority mailed Jul. 18, 2022 corresponding to PCT International Application No. PCT/EP2022/054007 filed Feb. 17, 2022.

(Continued)

*Primary Examiner* — Joseph Chang
(74) *Attorney, Agent, or Firm* — Schmeiser, Olsen & Watts LLP

(57) ABSTRACT

A control system providing a control signal to an energy storage system to reduce power variability of an energy generation system. The energy storage system is coupled to the power output of the energy generation system and configured to at least one of receive and provide electrical power in response to the control signal. The control system includes a monitoring unit to monitor the power output and (Continued)

to provide a respective monitoring signal. The control system further includes a control signal generation unit to generate the control signal from the monitoring signal, and implement a filtering unit that has a band pass response. The filtering unit passes a predetermined frequency band of the monitoring signal and the control signal generation unit is configured to generate the control signal in the frequency band to compensate power variations of the power output of the energy generation system in the frequency band.

15 Claims, 6 Drawing Sheets

(52) U.S. Cl.
CPC ....... *H02J 2203/20* (2020.01); *H02J 2300/24* (2020.01); *H02J 2300/28* (2020.01)

(58) Field of Classification Search
USPC .......................................................... 307/102
See application file for complete search history.

(56) References Cited

FOREIGN PATENT DOCUMENTS

| | | |
|---|---|---|
| JP | 2004147445 A | 5/2004 |
| JP | 2017028861 A | 2/2017 |
| KR | 101738427 B1 | 5/2017 |

OTHER PUBLICATIONS

T. Ikegami, C. T. Urabe, T. Saitou, and K. Ogimoto, "Numerical definitions of wind power output fluctuations for power system operations," Renew. Energy, vol. 115, pp. 6-15, 2018.

K. Yoshimoto, N. Toshiya, G. Koshimizu, and Y. Uchida, "New control method for regulating State-of-Charge of a battery in hybrid wind power/battery energy storage system," 2006 IEEE PES Power Syst. Conf. Expo. PSCE 2006—Proc., vol. 8165, pp. 1244-1251, 2006.

S. Teleke, M. E. Baran, S. Bhattacharya, and A. Huang, "Control Strategies for Battery Energy Storage for Wind Farm Dispatching," IEEE Trans. Energy Convers., vol. 24, No. 3, pp. 725-732, 2009.

J. Lin, Y. Sun, Y. Song, W. Gao, and P. Sorensen, "Wind power fluctuation smoothing controller based on risk assessment of grid frequency deviation in an isolated system," IEEE Trans. Sustain. Energy, vol. 4, No. 2, pp. 379-392, 2013.

H. Holttinen, M. Milligan, B. Kirby, T. Acker, V. Neimane, and T. Molinski, "Using Standard Deviation as a Measure of Increased Operational Reserve Requirement for Wind Power," Wind Eng., vol. 32, No. 4, pp. 355-377, 2010.

H. Holttinen, "Estimating the impacts of wind power on power systems—Summary of IEA Wind collaboration," Environ. Res. Lett., vol. 3, No. 2, 2008.

Hannele Holttinen (VTT) et al: "Design and operation of power Systems with large amounts of wind power", Final Summary report, IEA WIND25, Phase free 2012-2014; ISBN 978-951-38-8444-4 (URL: http://www.vttresearch.com/impact/publications), VTT Technology 268; ISSN-L 2242-1211; ISSN 2242-122x (Online) http://urn. †i/URN:ISBN:978-951 -38-8444-4.

B. Singh and S. N. Singh, "Wind Power Interconnection into the Power System: A Review of Grid Code Requirements," Electr. J., vol. 22, No. 5, pp. 54-63, 2009.

H. Holttinen et al., Design and operation of power systems with large amounts of wind power—Final summary report, IEA WIND Task 25, Phase three 2012-2014. 2016.

A. Ellis, D. Schoenwald, J. Hawkins, S. Willard, and B. Arellano, "PV output smoothing with energy storage," Conf. Rec. IEEE Photovolt. Spec. Conf., No. March, pp. 1523-1528, 2012.

S. Smith, The scientist and engineer's guide to digital signal processing. 1997.

T. Kanehira and A. Takahashi, "A comparison of electric power smoothing control methods for the distributed generation system," 2013 IEEE 10th Int. Conf. Power Electron. Drive Syst., No. 3, p. Article No. 6527036, pp. 311-316, 2013.

H. Holttinen, "Impact of hourly wind power variations on the system operation in the nordic countries," Wind Energy, vol. 8, No. 2, pp. 197-218, 2005.

M. Tsili and S. Papathanassiou, "A review of grid code technical requirements for wind farms," IET Renew. Power Gener., vol. 3, No. 3, p. 308, 2009.

M. Raoofat, M. Saad, S. Lefebvre, D. Asber, H. Mehrjedri, and L. Lenoir, "Wind power smoothing using demand response of electric vehicles," Int. J. Electr. Power Energy Syst., vol. 99, No. Nov. 2017, pp. 164-174, 2018.

C. Luo and B. T. Ooi, "Frequency deviation of thermal power plants due to wind farms," IEEE Trans. Energy Convers., vol. 21, No. 3, pp. 708-716, 2006.

C. Sourkounis and P. Tourou, "Grid Code Requirements for Wind Power Integration in Europe," Conf. Pap. Energy, vol. 2013, pp. 1-9, 2013.

SONI, "SONI Grid Code," 2018.

UCTE, "P1: Load-Frequency Control and Performance," Cont. Eur. Oper. Handb., No. Cc, pp. P1-1-P1-32, 2009.

L. Xiangjun, H. Dong, and L. Xiaokang, "Battery Energy Storage Station (BESS)-Based Smoothing Control of Photovoltaic (PV) and Wind Power Generation Fluctuations," IEEE Trans. Sustain. Energy, vol. 4, No. 2, pp. 464-473, 2013.

M. Lave, J. Kleissl, A. Ellis, and F. Mejia, "Simulated PV power plant variability: Impact of utility-imposed ramp limitations in Puerto Rico," Conf. Rec. IEEE Photovolt. Spec. Conf., pp. 1817-1821, 2013.

\* cited by examiner

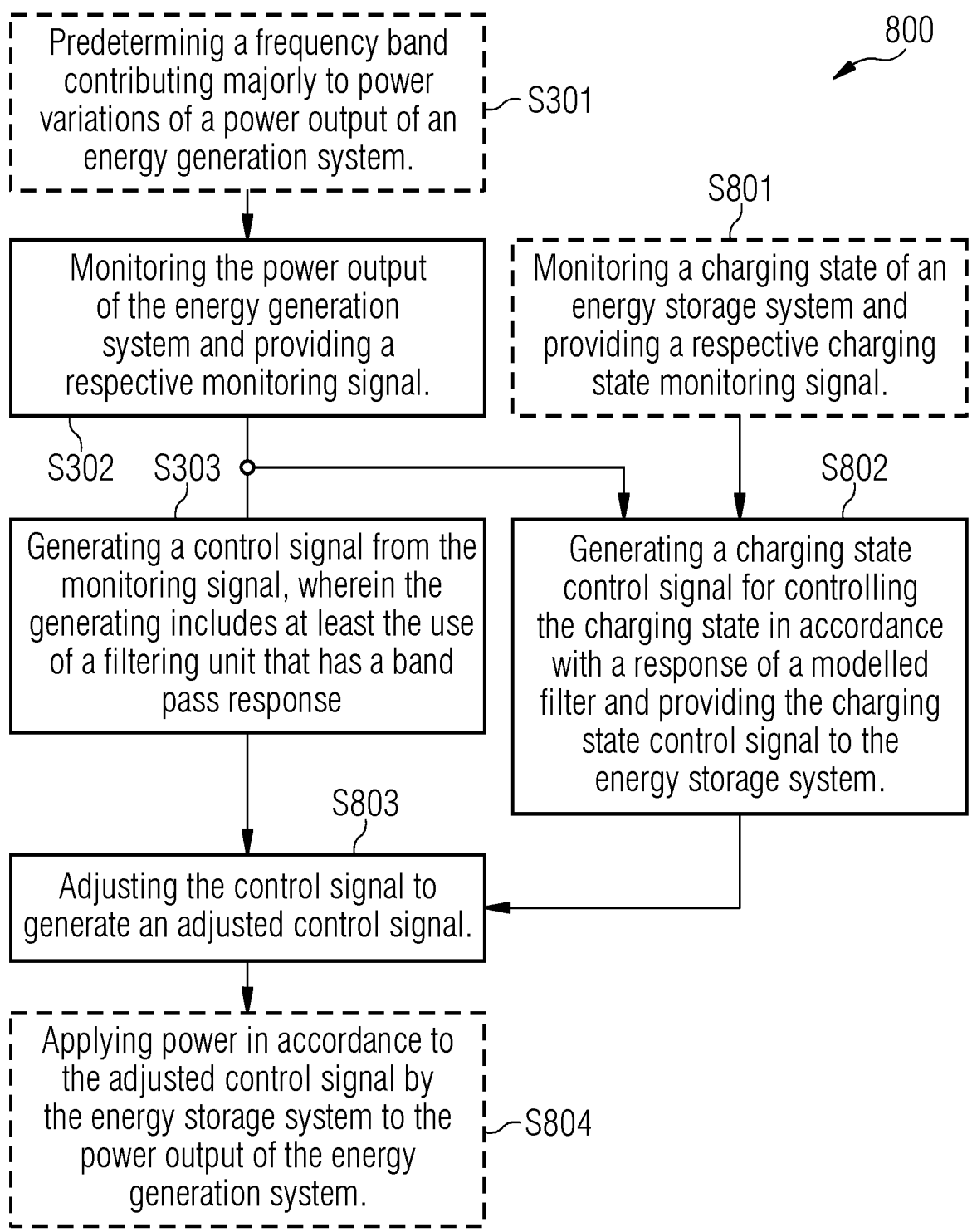

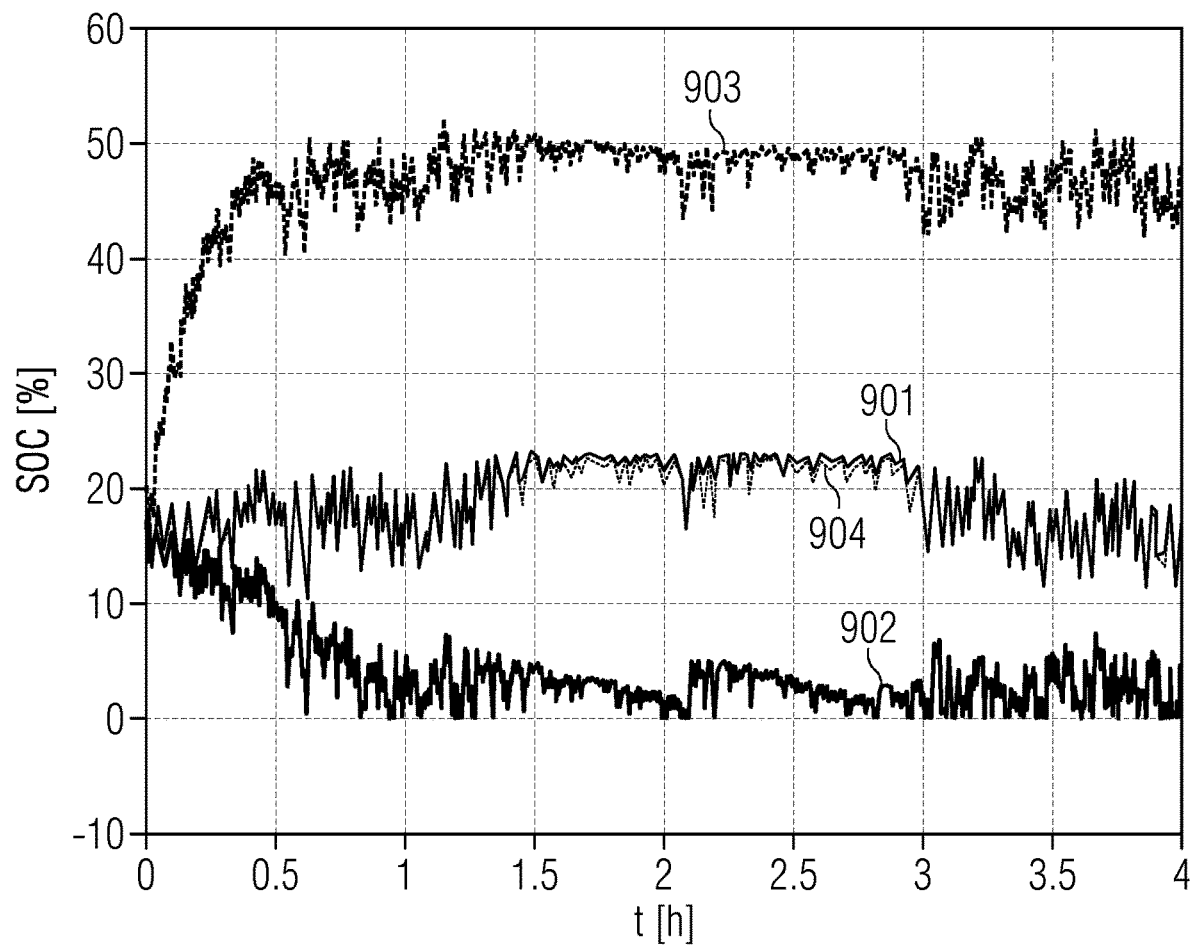

SYSTEMS AND METHODS FOR POWER VARIABILITY REDUCTION

CROSS-REFERENCE TO RELATED APPLICATIONS

This application claims priority to PCT Application No. PCT/EP2022/054007, having a filing date of Feb. 17, 2022, which claims priority to EP Application No. 21382172.1, having a filing date of Mar. 1, 2021, the entire contents both of which are hereby incorporated by reference.

FIELD OF TECHNOLOGY

The following relates to a system, in particular to a control system, for reducing power variability of an energy generation system. The following further relates to a method for reducing power variability of an energy generation system and to a respective computer program.

BACKGROUND

With the increasing commissioning of renewable energy generation systems, for example wind farms or solar farms, there is a rising concern about the problems associated with the variability of the power output thereof. Considering wind farms, the wind strength is variable, wind may even not be available at all and strongly depends on meteorological conditions. This results in that the generated power output may comprise highly dynamic power variations over time, which may destabilize the power system. Grid codes are therefore in force which impose limits on the power variability, and which require smoothing of power variations to improve the stability of power systems. In order to at least partly compensate power variations output by a renewable energy generation system, such a system can be complemented by an energy storage system, which is used in order to deliver or receive a compensating portion of power in case of power deviations, for example in case of power overshoots or undershoots. Forming reserves of active power, which have to be available to the energy generation system in the required time, implies high costs for the system. Since the compensation of occurring power variations can require high dynamics of the power flow associated with the energy generation system, and since occurring power variations can last over a longer period of time (30 minutes or more), the power requirements for the energy storage system are highly demanding. The required high performance may also result in faster aging of the energy storage system. Further, while compensating power variations, the charging state of the energy storage system may drift to a fully charged or discharged state. To prevent the system from reaching such a system state, the energy storage system is appropriately sized, more specifically oversized, in order to ensure that the energy storage system does not reach its technical limits. Accordingly, such energy storage systems are designed generously or are oversized in order to meet the outlined demanding requirements. The oversizing results in a high consumption of resources and an increased maintaining effort, both of which are associated with increased costs.

Document JP 2004 147445 A relates to controller that extracts the power variations from an effective power of a load detected by an effective power detector, and extracts a frequency oscillation component from a frequency detected by a frequency detector. The controller controls charging and discharging of a power storage unit based on a sum of a first command value for suppressing the power variations, and a second command value for suppressing the power oscillation.

Document US 2015/194820 A1 is related to a control apparatus and corresponding control method which use per-unit filtering in a plurality of power-sharing controllers to obtain a power-sharing command signal for respective ones among a plurality of different energy storage units in a hybrid energy storage system.

SUMMARY

Accordingly, there is the need to mitigate at least some of the drawbacks mentioned above and to reduce power reserve requirements for an energy storage system associated with the compensation of the power variability of an energy generation system.

According to an embodiment of the invention, a control system for providing a control signal to an energy storage system to reduce power variability of an energy generation system, e.g. a power plant, is provided. The energy storage system is coupled to the power output of the energy generation system and configured to at least one of receive and provide electrical power in response to the control signal. The control system comprises a monitoring unit configured to monitor the power output of the energy generation system and to provide a respective monitoring signal. The control system further comprises a control signal generation unit configured to generate the control signal from the monitoring signal, wherein the control signal generation unit implements a filtering unit that has a band pass response. The filtering unit passes a predetermined frequency band of the monitoring signal and the control signal generation unit is configured to generate the control signal in said frequency band so as to compensate power variations of the power output of the energy generation system in said frequency band.

In an example, the control signal for compensating said variations is derived only from said monitoring signal in said predetermined frequency band so that the power variations are only compensated in said frequency band.

An energy generation system equipped with such a control system focuses the compensation of power variations on a defined frequency band and avoids compensation of power variations beyond it. The power output to be fed into the power grid is smoothed at the relevant frequencies. Accordingly, a reduced amount of energy has to be transmitted by the energy storage system in order to compensate power variations occurring in the output of the energy generation system. Reserve power requirements for the energy storage system can therefore be reduced. Limiting the smoothing action to the frequency band also results in a reduced burden on the energy storage system. As a consequence, associated costs and consumption of resources can be decreased, for example by adapting the sizing of the energy storage system in accordance with the reduced reserve power requirements.

The control signal is in particular generated such that by operation of the energy storage system, the power variations in the combined output of energy generation system and energy storage system are reduced (compared to operation of the power generation system alone). In other words, the control signal is generated such that the charging/discharging of the energy storage system smooths the power output of the power generation system.

The control signal may be a reference power signal indicating the power to be received or to be provided by the energy storage system.

Further, the predetermined frequency band may comprise frequencies that contribute majorly to the power variations of the power output of the energy generation system. Thus, it should be clear that that the predetermined frequency band may be tailored to the energy generation system characteristics of the energy generation system and/or the operation characteristics of the energy generation system. Major contribution means that the predetermined frequency band includes frequencies that, if smoothed out, mainly reduce the probability of occurrence of non-admissible power variations, for example down to a probability below 50%, below 10%, or even below 1% or 0.1%. The frequency band may, e.g., include a continuous range of frequencies including at least 25% in particular at least 40% of the power of the variations, e.g. of the power in the frequency spectrum of the power variations. For example, high frequency components are mostly related to power flicker but rather do not induce non-admissible power variations, and these can further be compensated by internal controls of the power generation system. Lower frequencies are rather related to longer term drift and can be compensated on a grid level. By avoiding such frequencies using the frequency band, a more optimal design of the energy storage system can be employed, leading to a significant decrease in its size and ageing. Frequencies that majorly contribute to the power variations may be identified based on an analysis of power variation data and by using an optimization algorithm.

Said non-admissible power variations may occur when power variations occur that exceed a predetermined frequency range, and/or when variations occur that exceed a predetermined amplitude.

Hence, the predetermined frequency band may be predetermined such that a probability of an occurrence of a non-admissible variation in the power output of the energy generation system is below a (predetermined) threshold. Said non-admissible variation may exceeds a predetermined frequency range and/or predetermined amplitude In particular, the threshold may for example be a probability below 50%, below 10%, or even below 1% or 0.1% as mentioned above. The threshold may for example be derived from said historical/empirical data of the power variation data, e.g. based on an analysis of a probability density function and a cumulative distribution function of the power variations as herein described. As said, the frequency band that reduces the probability of occurrence of non-admissible power variations down to the (predetermined) threshold may for example be identified based on said data and by using an optimization algorithm.

The historical/empirical data may for example be collected during different operation modes of the energy generation system, e.g. while being connected and/or disconnected to an (external) grid, e.g. a DC or AC grid.

It should be clear that the control system may then be tailored to operate in said operation modes and smooth the power output of the energy generation system, e.g. while being connected and/or disconnected to an (external) grid, e.g. a DC or AC grid. It should further be clear that such frequency band that is specifically tailored to the power generation system is advantageous since it reduces the power variability more effectively and, accordingly, reduces the stress acting on the system.

The predetermined frequency band may include a frequency of 0.1 Hz and the predetermined frequency band at least comprises frequencies between 10 mHz and 30 mHz. The frequency band may for example include frequencies between 1 mHz and 30 mHz, or between 1 mHz and 1 Hz. The predetermined frequency band may for example exclude frequencies below $10^{-4}$ Hz, or below $5*10^{-4}$ Hz. The frequency band may be further configured in order to smooth effects associated with bandwidths related to frequency deviations or voltage flicker. In particular, the frequency band may correspond to a frequency range determined for secondary frequency regulation by an operator of the power grid. The frequency band is continuous.

In an embodiment, the filtering unit comprises a band-stop filter. The band-stop filter can be implemented by a combination of a high-pass filter and a low-pass filter. As an example, the high-pass filter and the low-pass filter may be connected in parallel, wherein the output signals of both filters are summed, the high-pass filter defining an upper boundary of the frequency band and the low-pass filter defining a lower boundary of the frequency band.

The monitoring signal may be filtered by the band-stop filter, and the monitoring signal is subtracted from the filtered monitoring signal to obtain the band pass response. By the subtraction, the signal components passed by the bandstop filter cancel out, so that only the inverted frequency components of the stopband remain due to the subtraction. Accordingly, a bandpass response between the lower and upper boundaries is obtained, the signal being inverted compared to the monitoring signal.

Alternatively, the filtering unit may directly implement a band-pass filter having a pass band between the lower and upper boundaries, which may for example be obtained by a series connection of a high-pass and a low-pass filter. An inverter may furthermore be used to invert the monitoring signal before or after filtering, so that the resulting control signal results in a power flow from the energy storage system that negates the variations.

For example, the part of the control signal that compensates the power variations may only comprise frequencies within said frequency band. Frequencies outside the frequency band may be attenuated (significantly) or not be present. The control signal may accordingly have a frequency content such that only power variations at frequencies within said frequency band are compensated. The control signal may only consist of this part that compensates the power variations, or may include an additional part that is not providing compensation of the power variations, for example a part that controls the charging state of the energy storage system, as explained in more detail below.

In an example, the control signal is (only) in said frequency band when the control signal is received at the energy storage system.

In an example, the control signal generation unit may output the control signal and operate on the monitoring signal as a filter having a band-pass response. Hence, the control signal may be generated as the band-pass filtered (and gained) monitoring signal.

In an example, the control signal generation unit may directly provide the control signal to the energy storage system.

In an example, the control signal may be the only signal that is provided to the energy storage system and/or that is received at the energy storage system.

In an example, the energy storage system may be only controlled by the signal that is output by the control signal generation system.

In an example, the energy storage system is coupled to the power output of the energy generation system at a coupling point and the coupling point provides a variation compensated power output by combining the power output of the energy generation system and power that is at least one of received and provided by the energy storage system, wherein the variation compensated power output corresponds to a band-stop response on the power output of the energy generation system, wherein the stop-band corresponds to a pass-band of the band pass response.

In an example the control system is configured to generate the control signal only within, or alternatively only within and below said frequency band.

Thereby, it may be ensured that the control signal is restricted to the predetermined frequency band and smooths/reduces the variability of the power output of the energy generation system only in the predetermined frequency band. This renders the smoothing operation/variability reduction more efficient since the energy/power required therefore is reduced. Hence, the stress acting on the system is also reduced.

In an example, the control signal may be generated independently/without being influenced by the system behavior or input/output behavior of the energy storage system.

In other words, the control signal may be generated based on the monitoring signal in a feedforward way. A signal that comprises information about the energy storage system, e.g. the output power, and is fed back, e.g. by a feedback loop, may not necessarily be present and may not be employed in the control signal generation. Such structure allows generating unitary control signals based on the same respective input for different energy storage systems. That may facilitate the planning, manufacturing, and implementation of the control system. Further, such structure requires less computation effort and may accordingly allow reducing a sampling time according to which a value of the control signal is derived. Thus, the reduction of the variability may be more effective.

In an example, the control signal may be generated only from the monitoring signal and additionally or alternatively based only on such signals that originate from/are derived from/are based on the monitoring signal. Either the control signal or the part that compensates power variations may be generated only from a signal that passes the filtering unit.

This may reduce the hardware and implementation effort due to the fact that, e.g., only one signal is required to be monitored.

In an example, the control system may be configured to generate the control signal only in the frequency band. In another embodiment the control system may be configured to generate the control signal in the frequency band (for compensating power variations) and below the frequency band (e.g. for controlling a charging state).

Such control signal controls the energy storage system such that it is still capable to efficiently reduce the power variability. Such control signal may however be additionally capable to transport information related to a further functionality, e.g. information that may ensure a stable state of charge of the energy storage system.

In an embodiment, the control system further comprises a charging state controlling unit, wherein the charging state controlling unit generates a charging state control signal provided to the energy storage system to adjust a charging state of the energy storage system in accordance with a charging state reference signal.

The control system is configured to adjust the control signal of the control signal generation unit by the charging state control signal, for example by adding the charging state control signal to the control signal. The charging state is in particular controlled such that the energy storage system does not drift into a fully charged or fully discharged state (in which it could not take up or supply electrical power, respectively), but is driven towards this reference.

The charging state reference signal can be a fixed, predetermined reference, for example representing a constant predefined value, or a variable reference, which may be derived during operation.

Using such a charging state controlling unit, it can be ensured that the charging state cannot drift to a destabilized fully charged or discharged state but is kept at a predetermined level (i.e. close to the reference). Accordingly, burden on the energy storage system is decreased, and it can also be ensured that smoothing of the power variations can be performed over prolonged periods of time, even if losses occur in the energy storage system.

The charging state controlling unit may be configured to derive the charging state reference signal from the monitoring signal under consideration of the transfer function of the filtering unit.

The charging state controlling unit includes a modelled filter that represents at least a model of the charging state of the energy storage system to derive the charging state reference signal.

In an example, the charging state reference signal is derived such that the charging state reference signal at least represents a modelled actual charging state of the energy storage system. In particular, the modelled filter may represent the charging state of the energy storage system in the ideal case, i.e. in the case in which a lossless system is assumed.

The modelled filter includes at least a second order low-pass filter or the modelled filter includes at least an integrator.

In an example, the model of the charging state of the energy storage system derives the charging state reference signal from the monitoring signal. For example, when the modelled filter includes at least the second order low-pass filter, the output signal of the modelled filter may be directly derived from the monitored signal, and when the modelled filter includes at least the integrator, the output signal of the modelled filter may be derived from the control signal, the control signal being based on the monitoring signal.

A model-based charging state control ensures a stable state-of-charge while minimizing the effect of the charging state control on the in parallel performed smoothing operations that are applied to the power output of the energy generation system. Even though the state of charge is controlled and drifts therefrom are prevented, the system consumes still approximately the same energy as in the ideal case (lossless system).

In an embodiment, the charging state controlling unit further comprises a gain unit in order to tune the effect of the charging state controlling unit on the reduction of power variability. For example, a scaling factor may be applied to the charging state reference signal. The scaling factor comprises a range from zero to one.

Such a gain unit allows tuning or adjusting the effect of the charging state control on the performance of the variability reduction, i.e. how much the control signal that controls the power flow from the energy storage system for smoothing is 'disturbed' by the charging state reference signal. Using an appropriate scaling factor allows further optimization of the efficiency of both operations.

According to an example, the charging state reference signal comprises a minimum charging state value that ensures that the charging state of the energy storage system is kept to the minimum charging state value, wherein the minimum charging state value is predetermined.

The minimum charging state value may be the only signal comprised in the charging state reference signal or additionally comprised in the charging state reference signal together with other signals, e.g. as a sum of the comprised signals.

According to another embodiment of the invention, a system configured to reduce power variability of an energy generation system is provided. The system comprises an energy storage system coupled to the power output of the energy generation system. The energy storage system is configured to at least one of receive and provide electrical power in response to a control signal. Further, the system comprises a control system having any of the configurations described herein, which is coupled to the energy storage system to provide the control signal to the energy storage system to reduce power variability of the energy generation system. The system may further comprise the power generation system.

The energy generation system may further comprise a renewable energy power source. The renewable energy power source is at least one of one or more wind turbines and one or more solar power systems.

According to another embodiment of the invention, a method for providing a control signal to an energy storage system to reduce power variability of an energy generation system is provided, wherein the energy storage system is coupled to the power output of the energy generation system and configured to at least one of receive and provide electrical power in response to the control signal. The method comprises monitoring, by a monitoring unit, the power output of the energy generation system and providing a respective monitoring signal and generating, by a control signal generation unit, the control signal from the monitoring signal, wherein the generating includes at least the use of a filtering unit that has a band pass response, the filtering unit passing a predetermined frequency band of the monitoring signal, wherein the control signal is generated in said frequency band so as to compensate power variations of the power output of the energy generation system in said frequency band. By such method, advantages similar to the ones outlined further above may be achieved.

The control signal may in particular be generated as a bandpass filtered and inverted version of the monitoring signal, wherein further signal processing can be applied, such as a real or complex gain or the like.

The method may further comprise generating, by a charging state controlling unit, a charging state control signal, either based on a predefined charging state reference or in accordance with the response of a modelled filter, and providing the charging state control signal to the energy storage system.

In an embodiment, the method further comprises adjusting the control signal of the control signal generation unit by the charging state control signal, for example by adding the signals.

According to another embodiment of the invention, a computer program product (non-transitory computer readable storage medium having instructions, which when executed by a processor, perform actions) for providing a reference power signal for an energy storage system to reduce power variability in an energy generation system is provided. The computer program comprises control instructions which, when executed by a processing unit of a control system coupled to the energy storage system, cause the processing unit to perform any of the methods described herein.

According to another embodiment of the invention, a control system controlling the charging state of an energy storage system is provided. The energy storage system is configured to reduce power variability of an energy generation system and is coupled to the power output of the energy generation system and configured to at least one of receive and provide electrical power in response to a control signal generated by processing a monitoring signal with a filtering unit, wherein the monitoring signal is indicative of a power output of the energy generation system. The control system comprises a charging state controlling unit configured to generate a charging state control signal for adjusting the charging state of the energy storage system, wherein the charging state control signal is generated based on a monitored charging state of the energy storage device and a charging state reference signal, wherein the charging state controlling unit is configured to derive the charging state reference signal from the monitoring signal under consideration of the transfer function of the filtering unit. As the transfer function is decisive for the generation of the control signal and thus for the flow of energy into and out of the energy storage device, considering this transfer function in the generation of the reference for the charging state may result in a control that minimizes the power reserve requirements and that maintains the charging state at a level suitable for compensating the occurring power variations.

The charging state control signal may for example be formed by subtracting the monitored charging state of the energy storage device from the charging state reference signal.

Further, the control system controlling the charging state may be configured to add the charging state controlling signal to the control signal to obtain an adjusted control signal, and to control the energy generation system by means of the adjusted control signal.

The charging state controlling unit may include a modelled filter, wherein the modelled filter represents at least a model of the charging state of the energy storage system, the modelled filter being determined based on the transfer function of the filtering unit. The modelled filter may be configured as described above, it may in particular be implemented as an at least second order low pass filter.

The charging state controlling unit may further comprise a gain unit in order to tune or adjust the effect of the charging state controlling unit on the reduction of power variability. Such gain unit may be implemented as described above and may provide the respective advantages.

The control system may furthermore include any of the features and aspects described herein above and further below with respect to the generation of the control signal for controlling the energy storage device, in particular the monitoring unit and the control signal generation unit.

According to another embodiment of the invention, a corresponding method of controlling the charging state of an energy storage system is provided. The method may include generating, by a charging state controlling unit, a charging state control signal for adjusting the charging state of the energy storage system, wherein the charging state control signal is generated based on a monitored charging state of the energy storage device and a charging state reference signal, and deriving the charging state reference signal from the monitoring signal under consideration of the transfer function of the filtering unit.

According to a further embodiment, a respective computer program that comprises control instructions which implement the respective method of controlling the charging state is provided.

Each computer program may be implemented on a storage medium or data carrier, such as a volatile or non-volatile storage medium.

Any of the methods or method steps described herein may be performed by the control system in any of the configurations disclosed hereinabove or further below. Likewise, the control system may be configured to carry out any of the method steps described herein.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

Figure 1:
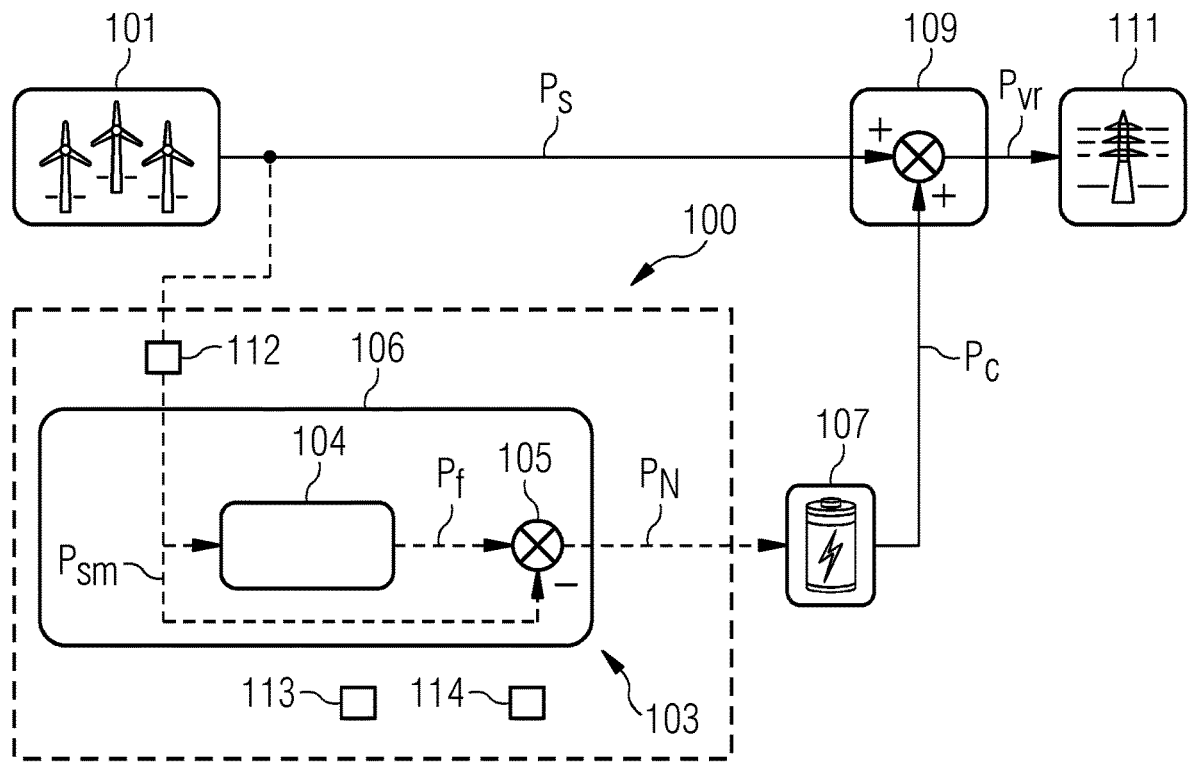
FIG. 1 is a schematic drawing illustrating a control system generating a control signal for reducing power variability of an energy generation system according to an embodiment of the invention.

FIG. 8 is a schematic flow diagram describing a method for controlling a charging state of an energy storage system and for reducing power variability of an energy generation system according to an embodiment of the invention; and FIG. 9 is a schematic diagram illustrating the charging state of an energy storage system while applying and not applying a charging state control according to embodiments of the invention.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 shows a schematic signal flow chart illustrating a principle control scheme for reducing power variability of an energy generation system 101 according to an embodiment of the invention. The energy generation system 101 generates electrical power Ps and the output thereof is coupled to the input of a power grid 111 via a summation point 109. The energy generation system can be, but is not limited to, a single power plant generating electrical power or general source of power. It is also possible that the energy generation system is composed by a plurality of power plants or general sources of power and these can be of different types. Examples are power plants of renewable energy, e.g. solar power plants and/or wind farms. The electrical power Ps may include inadmissible—e.g. according to grid codes—power variations. The power variations are compensated at the summation point 109 by combining the generated power Ps with a compensating power flow Pc provided by an energy storage system 107 in accordance with a power reference signal generated by a control system 100. Thereby, variability reduced power Pvr is generated.

An output of the energy storage system 107 is connected to the summation point 109. The magnitude of the compensating power flow Pc is controlled by a control signal Pr input to the energy storage system 107. The control signal Pr may be a power reference signal actuating the energy storage system 107 in such a way that the output compensating power flow Pc corresponds to the input control signal Pr. The energy storage system 107 is capable of receiving and providing electrical power as needed in accordance with the control signal Pr. The energy storage system 107 may be, but is not limited to, an electro-chemical energy storage system, e.g. a battery or an accumulator system. An example for an energy storage system 107 other than the electro-chemical system type can be a thermal energy storage system.

Control system 100 comprises a control signal generation unit 103, whose output is connected to the input of the energy storage system 107. The control signal generation unit 103 generates the control signal Pr on the basis of a monitoring signal Psm. The monitoring signal Psm is obtained by monitoring the electrical power Ps provided by the energy generation system 101 using a monitoring unit 112. The output of the monitoring unit 112 provides the monitoring signal Psm to the control signal generation unit 103.

The monitoring unit 112 may include an interface for receiving a signal indicating the power output of system 101, or it may be coupled to or include a single sensor or a sensing system measuring the output power, the unit providing the respective monitoring signal Psm. It is also possible that the monitoring signal Psm is obtained based on data via a respective interface of monitoring unit 112, which data comprises information about the power generated by the energy generation system 101 itself, for example if the information is provided by a controller of the energy generation system 101 (e.g. power plant controller). Further, it is possible that the signal Psm is based on data, which may be used to approximate, estimate or reconstruct the power Ps generated by the energy generation system as monitoring signal Psm, for example by an appropriate model or observer system. It should be clear that the monitoring of the monitoring unit 112 is not limited to the given examples.

The control signal generation unit 103 comprises a general filtering unit 106 smoothing the input monitoring signal Psm and providing a filtered monitoring signal at its output. For example, filtering unit 106 generates a filtered monitoring signal Pf of electrical power provided by the energy generation system 101 by applying a filter 104 or filter system to monitoring signal Psm. The filtering unit 106 has a band-pass response that passes a predetermined frequency band of the input signal Psm. Such band-pass response can be implemented in different ways. In some implementations, the output of the filter 104 and the input to the filter 104 (e.g. the signal Psm) are connected to summation point 105. At summation point 105, the monitoring signal Psm is subtracted from the filtered monitoring signal Pf. Such implementation is particularly suitable if filtering unit 104 implements a band-stop filter. In other implementations, summation point 105 may not be present, e.g. when implementing filter 104 as a band-pass filter. The output of the summation point 105 provides the output of the filtering unit 106, and in the example of FIG. 1 also the output of the control signal generation unit 103. The result is provided as control signal Pr to the energy generation system 107. It should be clear that in other implementations, the control signal generation unit 103 may comprise further signal processing elements, such as real or complex gain elements or the like, and these may be applied prior to or after the filtering with filtering unit 106 to generate the final control signal Pr.

In general, the topology of control system 100 extracts in a first step an inverse signal of power variations occurring in the power Ps generated by the energy generation system based on frequency bands defined by filtering unit 106. The inverse signal of power variations is applied in a second step as control signal Pr to the energy storage system 107 to actuate it such that it applies at summation point 109 a power flow in accordance with control signal Pr to the power Ps generated by the energy generation system 101. Accordingly, occurring power variations at frequencies predetermined by the filtering unit 106 are compensated. Resulting variability reduced electrical power Pvr is then provided to the power grid 111.

The control system 100 may include a processing unit 113, which may comprise any type of processor, such as a microprocessor, an application specific integrated circuit, a digital signal processor or the like, and a memory 114. The memory 114 may include volatile and non-volatile memory, in particular RAM, ROM, FLASH-memory, hard disc drives and the like. The memory 114 stores control instructions which, when executed by processing unit 113, cause the processing unit 113 to perform any of the methods described herein. Control system 100 further includes input and output interfaces for receiving data (e.g. monitoring unit 112) and for transmitting control data (e.g. the control signal Pr) to the energy storage system. In some implementations, unit 103 and filtering unit 104 may be implemented in form of software, and the processing of the monitoring signal may occur digitally. As such, it should be clear that the monitoring signal Psm and/or the control signal Pr may be a digital signal. In other implementations, signal processing and in particular filtering may occur in analog form, and filtering unit 104 may implement respective electric or electronic analog filters.

Figure 2:
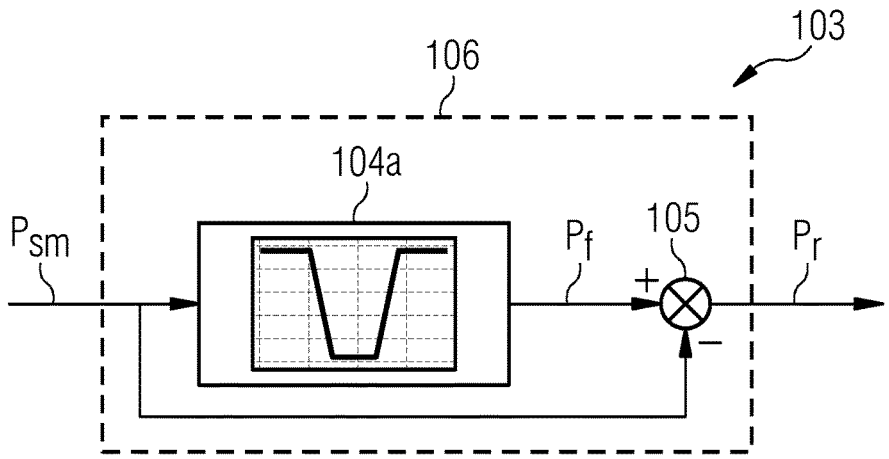
FIG. 2 is a schematic signal flow chart illustrating a generation of a control signal according to an embodiment of the invention.

FIG. 2 is a schematic signal flow chart illustrating a generation of the control signal Pr according to an embodiment of the invention. FIG. 2 shows an implementation of the control signal generation unit 103 according to FIG. 1. The control signal generation unit 103 is configured such that filtering of monitoring signal Psm acts on specific frequencies that are of most interest for the electrical system operation with regard to a reduction of power variability. For this purpose, the filtering unit 106 as shown in FIG. 1 implements the filter 104 as a band-stop filter 104a. The band-stop filter 104a can be implemented by a combination of a low-pass filter and a high-pass filter, which determine the lower and upper limits of the frequency bandwidth, respectively. The band-stop filter can for example be implemented by a parallel structure of the low-pass and high-pass filters, wherein the response of both filters to a common input signal is added. As an alternative, the high-pass filter of the proposed structure can also be substituted by a second low-pass filter, wherein the response of the second low-pass filter is subtracted from the input signal of the second low-pass filter. In the exemplary implementation, a fist-order version of a low-pass filter and a high-pass filter connected in parallel are used. Accordingly, following the scheme presented in FIG. 2, the filtered monitoring signal Pf can be calculated in the s-plane based on the monitoring signal Psm as $$P_f(s) = P_{sm}(s)\left(\frac{1}{\tau_L s + 1} + \frac{\tau_H s}{\tau_H s + 1}\right), \quad \text{(eq. 1)}$$

wherein $\tau_L$ is the time constant of the low-pass filter defining the lower bandwidth limit, $\tau_H$ is the time constant of the high-pass filter defining the higher bandwidth limit and s is the complex frequency. This solution for the implementation of a band-stop filter can be understood as a general guideline to designing a filter that affects specifically the desired frequencies, which are related to reserve requirements and frequency deviation events.

In the present example, a combination of a first order low-pass filter and a first-order high-pass filter are used. The use of a higher-order filter can also be considered if it is required to smooth the power variations in an appropriate way. Considering the topology of filtering unit 106, it is clear that the filtering unit 106 operates as a band-pass filter (of first or higher order) with a negative gain if a band-stop filter 104a is chosen for filter 104. Accordingly, the filtering unit 106 can alternatively be implemented by a respective band-pass filter or a filter system comprising a plurality of filters, wherein the input-output behavior of the filter system comprises an input-output behavior that corresponds to that of a band-pass filter. An example may be a parallel structure of low-pass filters or a serial structure of a high-pass and a low-pass filter.

Further, taking into account the topology of FIG. 1 and assuming an ideal control system 100 and energy storage system 107, the input-output behavior of the system for reducing power variability, in which the generated power Ps is the input signal and the variability reduced power Pvr is the output signal, corresponds to a band-stop filter (power variations in the defined frequency band are smoothed).

The band-stop filter topology as presented in FIG. 2 can be implemented using existing discretization methods for the implementation of filters. In the following example, Euler-backward method is assumed. Thus, for a sampling time $t_s$, the response $P_{sm,L}(t)$ of the low-pass filter to the monitoring signal Psm results in $$P_{sm,L}(t) = \quad \text{(eq. 2)}$$
$$P_{sm,L}(kt_s) = P_{sm,L}((k-1)t_s)\left(1 - \left(\frac{t_s}{t_s + \tau_L}\right)\right) + P_{sm}(kt_s)\left(\frac{t_s}{t_s + \tau_L}\right),$$

wherein t is time and k is an integer greater zero, and the start value may be initialized. The response $P_{sm,H}(t)$ of the high-pass filter to the monitoring signal Psm results in $$P_{sm,H}(t) = P_{sm,H}(kt_s) = (P_{sm,L}(kt_s) - P_{sm,H}((k-1)t_s))\left(1 - \left(\frac{t_s}{t_s + \tau_H}\right)\right), \quad \text{(eq. 3)}$$

wherein t is time and k is an integer greater zero, and the start value may be initialized. The response Pf of the respective band-stop filter therefore is $$P_f(t) = P_{sm,H}(t) + P_{sm,L}(t), \quad \text{(eq. 4)}.$$

Accordingly, the control signal Pr can be calculated by $$P_r(t) = P_f(t) - P_{sm}(t), \quad \text{(eq. 5)}.$$

The control signal generation unit 103 hence generates a control signal Pr in a predetermined frequency band so as to compensate power variations of the power output of the energy generation system in said frequency band. Since the system actuation of the energy storage system 107 focuses on specific frequency bands and avoids others, energy consumption of the energy storage system 107 is reduced and therefore the generated compensating power flow Pc is applied in a more efficient way. Since the burden on the energy storage system 107 is reduced, also power requirements thereof are reduced and the system can be dimensioned more compact. Further, due to the reduction of stresses (reduced charging/discharging cycling; level of charging/discharging currents), embodiments of the presented invention has also a positive effect on the aging of the energy storage system 107.

Figure 3:
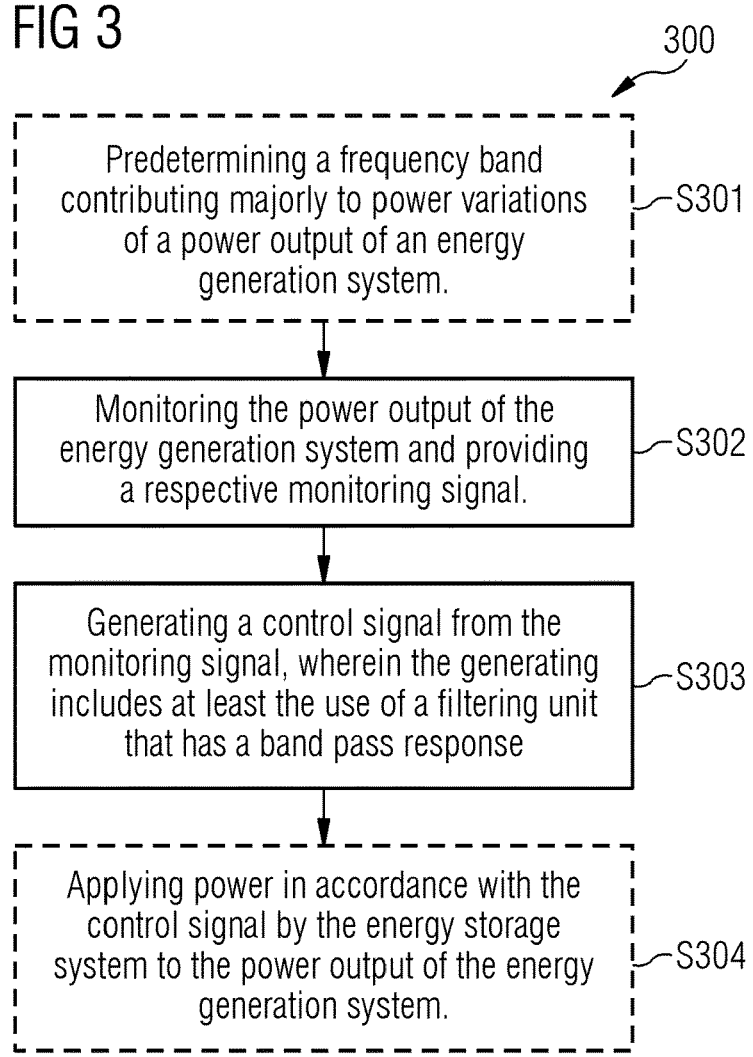
FIG. 3 is a schematic flow diagram describing a method for generating a control signal to reduce the power variability of an energy generation system according to an embodiment of the invention.

FIG. 3 shows a schematic flow diagram describing a method 300 to be performed to reduce power variability of an energy generation system as for example presented in FIGS. 1 and 2 according to an embodiment of the invention. The operational method comprises steps S302-S303. In some embodiments, the method may also comprise step S301 and/or step S304. According to the optional first step S301, the frequency band contributing majorly to the power variations of the power output of the energy generation system is predetermined. So, performing step S301 configures the control signal generation unit in such a way that it generates a control signal operating the energy storage system so as to compensate variations associated with the frequency band(s) specified. This allows an optimal tuning of the control system for a specific purpose. For example, it can be avoided that the control system attempts to reduce variations at very low frequencies, which are usually related to energy shifting applications, or variations at very high frequencies, which are out of the scope of reserve requirements. Thus, the control system is optimized to smooth specifically the variations that are of most interest. Step S301 may be performed only once in order to initialize the filter system. For example, the frequency band contributing majorly to the power variations can be ideally predetermined by an optimization algorithm and the filter system can be tuned in accordance with the result of the optimization algorithm. Step S301 may also be performed repeatedly in order to adapt the reaction of the control signal generation unit on specific frequency bands dynamically.

According to the second step S302, the power output of the energy generation system is monitored, e.g. by the monitoring unit 112. Further, the respective monitoring signal Psm is provided. The signal is received at the control signal generation unit and based on the monitoring signal, a control signal is generated, wherein the generating includes at least the use of the filtering unit 106 that has a band pass response. The filtering unit passes a predetermined frequency band of the monitoring signal, wherein the control signal is generated in said frequency band so as to compensate power variations of the power output of the energy generation system in said frequency band. Performing step S303 may also comprise updating the response of the filtering unit. Thereby, the control signal may be generated based on the equations eq. 1-5. The control signal is received at the energy storage system and in accordance with the control signal, power is applied to the power output of the energy generation system (S304). Power variations of the power output of the energy generation system are thereby compensated.

Figure 4:
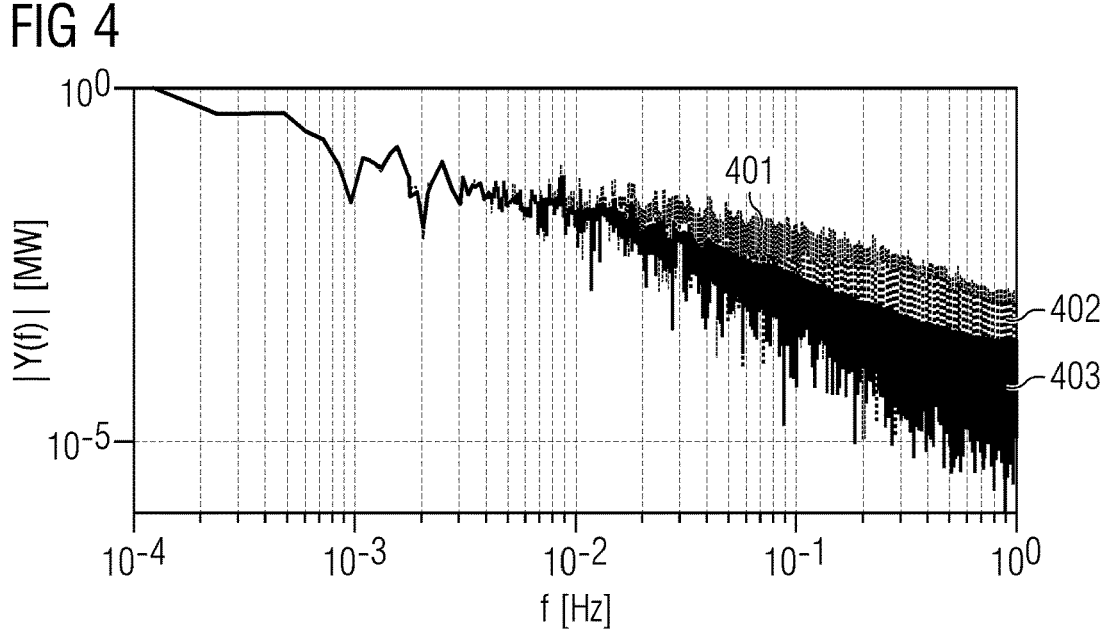
FIG. 4 is a schematic diagram illustrating an amplitude spectrum of a monitoring signal indicating the power output of an energy generation system and filtered variants thereof using either a low-pass filter or a band-stop filter.

FIG. 4 is a schematic diagram illustrating an amplitude spectrum of a power signal generated by an energy generation system as presented and of filtered variants thereof using either a low-pass filter or a band-stop filter. The diagram shows the absolute value of the amplitude of signals 401, 402 and 403 in the frequency space. The amplitude spectrum is obtained by a fast Fourier transform (FFT) of the respective time signals of the power output by the energy generation systems and the filtered variants thereof. Considering FIGS. 1 and 2, the diagram of FIG. 4 exemplarily shows signal 401 representing the electrical power Ps provided by energy generation system 101. Signals 402 and 403 represent the smoothed or variability reduced power Pvr using either a band-stop filter, BSF, (signal 402) or a low-pass filter, LPF, (signal 403). The response using a LPF presents a low gain reducing variations for frequencies above 10 mHz. On the other hand, the response using a BSF only has an effect on a specific frequency band around 0.1 Hz. More specifically, the BSF affects frequencies at least between 10 mHz and 30 mHz, in particular 1 mHz and 30 mHz, e.g. between 1 mHz and 1 Hz, but mostly around 0.1 Hz. This is one of the advantages of the solution of using a band-stop filter which can be tuned for the specific frequency range that should be smoothed.

Figure 5:
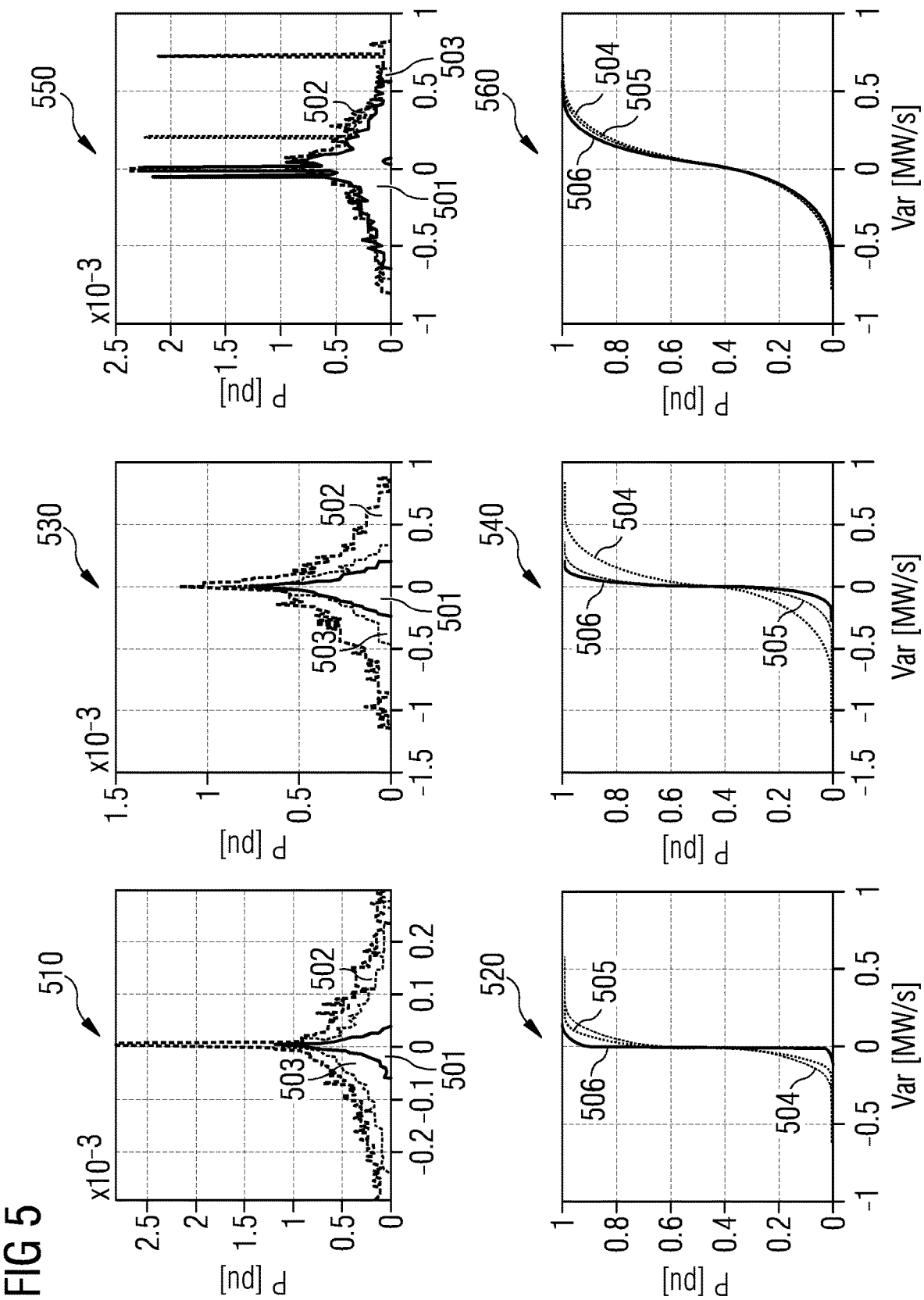
FIG. 5 is a schematic diagram illustrating probability density functions and cumulative distribution functions of power variations occurring during different operation modes of an energy generation system.

FIG. 5 is a schematic diagram illustrating the probability density functions (510, 530, 550), PDFs, and cumulative distribution functions (520, 540, 560), CDFs, of power variations occurring during different operation modes of an energy generation system as for example presented in FIGS. 1 and 2. A CDF depending on a variable x and corresponding to a respective PDF generally represents the probability p of an occurrence of an event according to a value less than or equal to the given value x. Considering FIG. 5, value x represents an upper limit of power variation. Since reserves are not sized to compensate all possible variations, CDFs that correspond to respective PDFs of occurring power variations can be used to determine the size of the reserves required to compensate the system variability. Power reserves are considered in different time frames according to the device's required actuation time. For energy generation systems, usual primary and secondary control level ranges of 1 minute and 30 minute variations are considered in FIG. 5. The decrease of reserve requirements is evaluated as shown in FIG. 5 using the cumulative distribution function (CDFs) of the variations at each time range.

Diagrams 530 and 540 represent 1 minute variations and diagrams 550 and 560 represent 30 minute variations. Further, 1 second variations are shown that are represented by diagrams 510 and 520. Each diagram 510-560 contains values regarding variations occurring in generated power Ps (502, 504) and filtered variants thereof (signal Pvr) for both, a LPF (501, 506) and a BSF (503, 505). The CDFs at 99% probability are evaluated and obtained results are shown numerically in table 1. It can be seen that a filtering unit using a LPF reduces the CDF for the 1 second and 1 min variations but hardly affects 30 min variations. On the other hand, a filtering unit using a BSF affects predominantly the 1 min variations.

TABLE 1

Maximum power variations occurring with a probability of 99%

|  | CDF_1 sec[MW/S] | CDF_1 min[MW/S] | CDF_30 min[MW/S] |
|---|---|---|---|
| Ps | 0.2558 | 0.535 | 0.6094 |
| Ps(LPF) | 0.0208 | 0.134 | 0.4214 |
| Ps(BSF) | 0.1719 | 0.2277 | 0.4876 |

Considering control signal Pr, the control system therefore focuses on the compensation of power variations in a predetermined frequency band and avoids compensation beyond it. In the following passage, the effect of the filtering on the stress of the energy storage system is analyzed. The used energy storage system stress parameters are summarized in table 2. It is noted that regarding Emax (maximum capacity), precise nominal capacity and state of charge (SOC) calculation is assumed and regarding Pmax (maximum power), symmetrical charge and discharge power requirements are assumed.

TABLE 2

Summary of energy storage system stress parameters

| Acronym | Parameter | Calculation |
|---|---|---|
| Emax | storage capacity | $(\max(SOC(t)) - \min(SOC(t)))C_n$ |
| Pmax | power | $\max(|P(t)|)$ |
| Eac | absolute ampere hour counting | $\int_{t_0}^{t_{end}} |P(t)| dt$ |
| Pavr | average power | $\frac{1}{t_{end} - t_0} \int_{t_0}^{t_{end}} |P(t)| dt$ |

TABLE 1

Results of energy storage system stress evaluation

|  | Emax [kWh] | Pmax [kW] | Eac [kWh] | Pavr (charging) [kW] | Pavr (discharging) [kW] |
|---|---|---|---|---|---|
| LPF | 12.5 | 1000 | 735.1 | 165.7 | 206.4 |
| BSF | 6.1 | 725.4 | 505.4 | 116.9 | 137.6 |
| Rel. deviation | −51% | −27% | −31% | −29% | −33% |

Table 3 underlines that an appropriate design of the filtering unit correlates with reduced stress parameters of the energy storage system. This significantly reduces the burden on the system. For example, Eac and Pavr are both parameters which are responsible for the aging of the system, and both are reduced by about a third.

Figure 6:
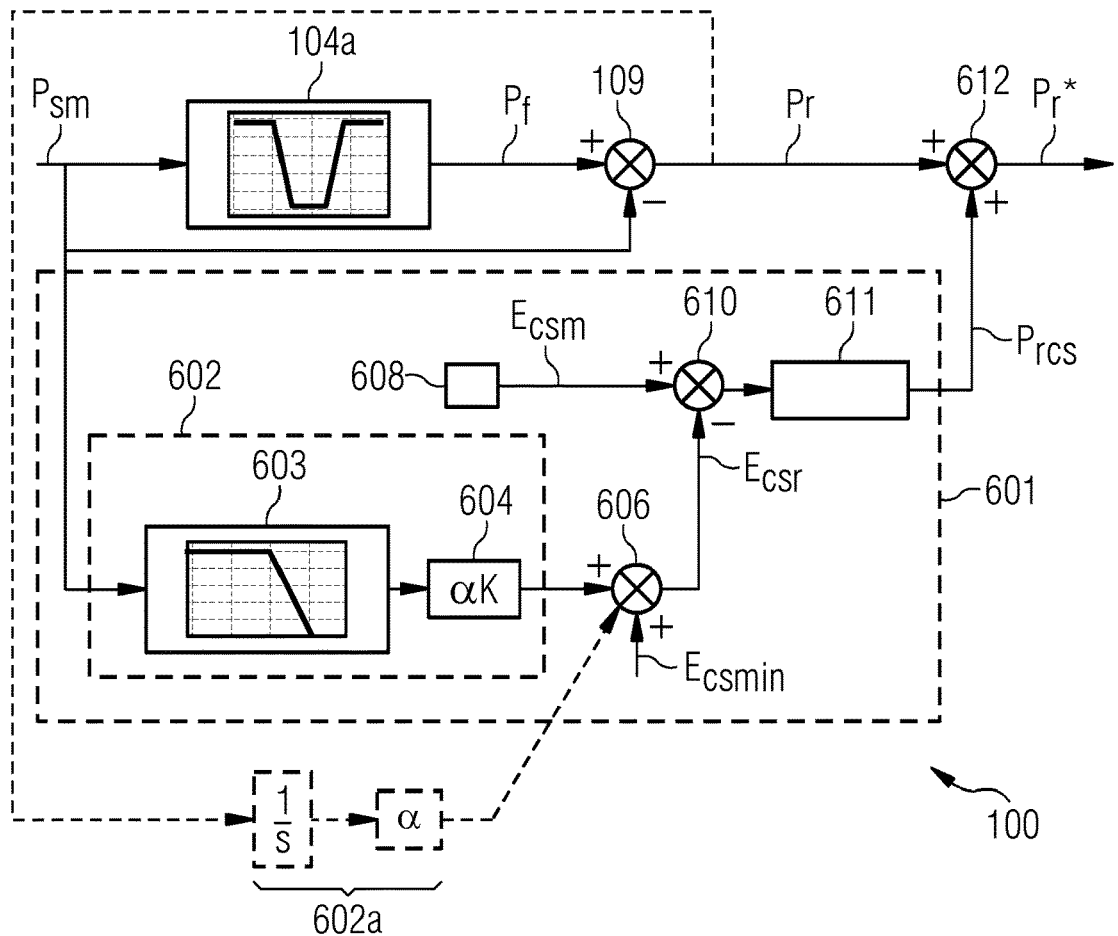
FIG. 6 is a schematic signal flow chart illustrating a principle control scheme for controlling a charging state of an energy storage system according to an embodiment of the invention.

FIG. 6 is a schematic drawing illustrating a control system 100 for controlling a charging state of an energy storage system according to an embodiment. The charging state control can be operated in parallel with the solution of reducing power variability in an energy storage system described above with respect to FIGS. 1-5 and extends the functionality thereof. The above explanations thus apply equally to the control system 100 of FIG. 6.

In smoothing applications, the charging state of the energy storage system 107 varies according to the power required for power variability compensation. Thus, it cannot be ensured that the energy storage system will not be continuously charged or discharged over time. A charging state control is provided that ensures that the charging state is always kept between admissible limits, even during a continuous operation of the smoothing system. In order to optimize the use of energy of the energy storage system and minimize the effect on the power smoothing, the implementation of the charging state control is adapted according to the selected smoothing method, in particular to the transfer function of filtering unit 106. The solution of the present example adapts the charging state control to the disclosed band-stop filter solution. The charging state control is therefore capable of further reducing the burden on the energy storage system and preventing a drift to a fully charged or discharged system state which would be highly demanding for an energy storage system, e.g. batteries. For this purpose, the control system 100 presented in FIG. 1 and, especially, FIG. 2 is extended by a charging state controlling unit 601.

The charging state controlling unit 601 generates a charging state control signal Prcs which may represent a power reference signal and is output to the input of a summation point 612. Another input to the summation point 612 is the control signal Pr generated by control signal generation unit 103, as shown in FIG. 1. At summation point 612, the charging state control signal Prcs is added to the control signal Pr in order to adjust the control signal Pr and to generate adjusted control signal Pr*. Instead of control signal Pr, the adjusted control signal Pr* is then output to the energy storage system as indicated in FIG. 1. Accordingly, the control signal Pr* may be a power reference signal actuating the energy storage system in such a way that the output compensating power flow Pc corresponds to the input control signal Pr*.

The charging state control signal Prcs of the illustrated embodiment is generated based on a model. More specifically, it is based on a dynamic model that models the minimum energy variation required by the energy storage system 107 to reduce the variations of the electrical power Ps provided by the energy generation system 101. The energy variation corresponds to integration over time of the power Pc output by the energy storage system or the respective control signal Pr thereof. Such a calculation is performed in real time. Specifically, the energy variation $\Delta E_v$ in the energy generation system, if a band-stop filter smoothing solution is applied, can be estimated depending on the compensating electrical power Pc provided by the energy storage system and the reference signal thereof, respectively. Reference signal Pr depends on the structure of control signal generation unit 103 and filtering unit 106. Considering the structure of the control signal generation unit and the given transfer functions, $\Delta E_v$ results in:

$$\Delta E_v(s) = \frac{1}{s} P_c(s) = \frac{1}{s} P_r(s) = \frac{1}{s}\left(\left(\frac{1}{\tau_L s + 1} + \frac{\tau_H s}{\tau_H s + 1}\right) - 1\right) P_{sm}(s)\right) = \quad \text{(eq. 6)}$$

$$(\tau_H - \tau_L)\left(\frac{1}{\tau_L s + 1} \frac{1}{\tau_H s + 1}\right)P_{sm}(s).$$

Accordingly, equation 6 represents the model of the minimum energy variation depending on the electrical power Ps output by the energy generation system and the monitored signal Psm thereof, respectively. The input-output behavior of the modelled filter 602 corresponds to that of a $2^{nd}$ order low-pass filter with a gain of $K=(\tau_H-\tau_L)$.

As an alternative to directing the monitoring signal Psm via the modelled filter 602 to summation point 606, which signal route implements the model of equation 6, it is possible to instantly integrate control signal Pr using integrator and gain element 602a. This is indicated in FIG. 6 by the dashed arrow directing signal Pr via an integration block to summation point 606. Since available computation results of the power variability reduction control are used by the alternative solution, required computing power for computing the output of the model may be reduced. However, the solution outlined above (using the modelled filter 602) has the advantage that it is faster if the integrator has to be implemented in discrete time.

In each case, using the model of equation 6, the reference signal Ecsr of the charging state can then be calculated by $$E_{csr}=E_{cs\ min}+\alpha\Delta E_v, \qquad \text{(eq. 7),}$$

wherein α is a proportional factor and α=1 is used for standard operation. However, factor α can be set to values deviating from 1 in order to tune the effect of the charging state control on the power variability reduction. The energy necessary for the regulation of the charging state of the energy storage system is obtained on the same power path as the power flow for reduction of power variability, so that the charging state control system influences the power flow and thus the reduction of power variability (which is evident from the adding of the control signals at 612). Thus, a value for α below 1 reduces the charging state control reference signal and reduces the energy to be exchanged for charging state regulation and therefore reduces the influence on the power variability reduction. Factor α can therefore be used to determine a compromise between the performance of the charging state control and of the power variability reduction.

According to equations 6 and 7, FIG. 6 shows a second order low-pass filter 603, wherein the input thereof receives monitoring signal Psm of the electrical power provided by the energy generation system. The output of the second order low-pass filter is provided to the gain unit 604, which comprises a product of tuning factor α and gain K. The output of the gain unit 604 is connected to the input of summation point 606. Another input of summation point 606 is the minimum charging state signal Ecs min. Ecs min represents a minimum charging state value ensuring that the charging state of the energy storage system cannot drop below that value for a longer period of time. The output of summation point 606 provides the charging state reference signal Ecsr and is connected to the input of summation point 610. At summation 610 the input Ecsr is subtracted from another input signal Ecsm that represents the charging state monitoring signal. The charging state monitoring signal Ecsm is provided by a respective charging state monitoring unit 608. Charging state monitoring signal Ecsm represents the actual value of the charging state of the energy storage system 107 and may be measured, e.g. by a sensor or sensor system or may be obtained data-driven. The output of summation point 610 is connected to the input of the charging state controlling filter 611. The charging state controlling filter 611 filters the control error provided by summation point 610. For this purpose the charging state controlling filter 611 is designed such that the charging state of the energy storage system follows the charging state reference signal. The charging state controlling filter 611 may for example comprise a scalar gain or may be partial integrative in order to compensate possible steady-state errors of the charging state. The implementation of the charging state controlling filter 611 may also be model-based itself, can be of linear or non-linear type, and its design is not limited to the given examples. The output of the charging state controlling filter 611 provides a charging state control signal Prcs and is connected to the input of summation point 612. Signal Prcs may be a power reference signal representing the required power flow to be applied in order to regulate the charging state of the energy storage system in accordance with the reference signal thereof. Hence, the charging state control signal Prcs is added to the control signal Pr at summation point 612, which is another input to summation point 612. Accordingly, the output of summation point 612 provides an adjusted reference control signal Pr* to the energy storage system. Pr* can be given as:

$$P^*_r(t)=P_r(t)-P_s(t)+k_{cs}(E_{csm}(t)-E_{csr}(t)), \qquad \text{(eq. 8).}$$

Herein, $k_{cs}$ is an example for a gain of charging state controlling filter 611. However, the charging state controlling filter 611 is not limited to a constant gain. It may also change over time, e.g. by implementing an adaptive control. Further, it may combine a plurality of filters, e.g. such filters comprising integrative or derivative parts. Pr* is a power reference signal that comprises a power reference signal portion for charging state control and a power reference signal portion for power variability reduction.

Figure 7:
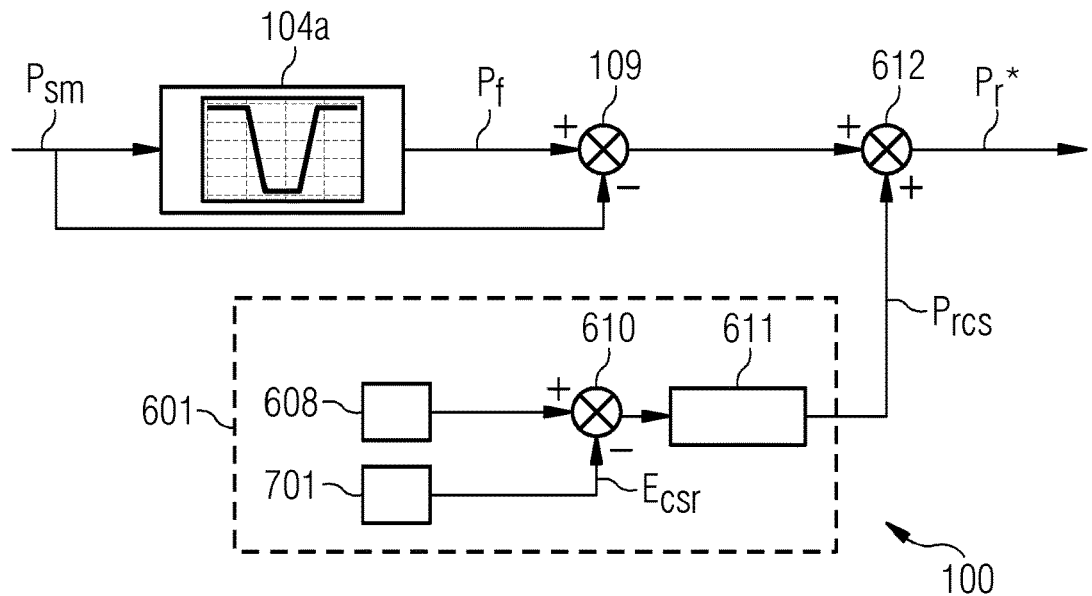
FIG. 7 is a schematic signal flow chart illustrating a principle control scheme for controlling a charging state of an energy storage system according to an embodiment of the invention.

FIG. 7 is a schematic drawing illustrating a further embodiment of a control system 100 configured to control a charging state of an energy storage system. The control system shown in FIG. 7 corresponds to that of FIG. 6, so the above explanations apply correspondingly. However, instead of basing the charging state reference signal Ecsr on the output of modelled filter 602, the charging state reference signal Ecsr is set to a constant value and is provided by constant charging state reference signal source 701. Again, it should be clear that the elements of charging state controlling unit 601 can be implemented digitally, as digital circuits or software running on processing unit 113, or as analog circuits.

FIG. 8 shows a schematic flow diagram of a method of controlling a charging state of an energy storage system and of reducing power variability of an energy generation system according to an embodiment, which may be performed by the control system presented in FIG. 6 or 7. The method 800 comprises steps S302, S303, S802 and S803. In some embodiments, the method may also comprise at least one of steps S301, step S801 and S804. Steps S301-S303 are performed in correspondence to the ones of method 300 as shown in FIG. 3. However, the control signal generated in step S303 is adjusted in step S803 before it is provided to the energy storage system. The adjusted control signal is then received at the energy storage system, which applies power in accordance with the adjusted control signal, the power flow being added to the power output of the energy generation system (S804). For this purpose, the charging state control signal is generated (S802) based on the monitoring signal that represents the power output of the energy generation system. The generating thereby comprises that the monitoring signal is filtered by a modelled filter, wherein the modelled filter represents at least a model of the charging state of the energy storage system. This filtering may be based on the equations 6-8.

In an embodiment, the charging state control signal is generated (S802) additionally based on a second monitoring signal representing the charging state of the energy storage system. Before step S802, the monitoring signals of the charging state of the energy storage system (step S801) and of the power output of the energy generation system (step S302) are obtained and used subsequently to generate the charging state control signal (step S802). The method may also comprise a step of tuning the effect of the charging state controlling unit on the reduction of power variability (not shown). This may be performed by tuning the gain unit 604.

Besides the reduction of the power variability of the energy generation system, the method ensures that the energy storage system is prevented from drifting to a fully charged or discharged state due to losses occurring while receiving or providing energy. It is therefore no longer necessary to oversize the energy storage system in order to prevent reaching these states of the energy storage system.

FIG. 9 shows a schematic diagram illustrating the charging state of an energy storage system while applying and not applying a charging state control according to the above-described embodiments. Signal 901 represents the ideal state of charge over time without taking losses into account. Signal 902 represents the state of charge over time without charging state control and taking losses into account. Signal 903 represents the state of charge over time with charging state control and taking losses into account, and using a non-modelled constant charging state reference signal according to an embodiment. Thus, signal 903 represents the effect of using the charging state control scheme as shown in FIG. 7. As an example, the charging state reference signal for the system generating signal 903 is set to a state of charge of 50%. Signal 904 represents the state of charge over time with charging state control and taking losses into account, and using a modelled reference signal according to an embodiment. Thus, signal 904 represents the effect of using the charging state control scheme as shown in FIG. 6.

It can be seen that signal 902 drifts from an initial state of charge of approximately 20% to a fully discharged state of the energy storage system due to non-compensated losses. Signal 903 shows a state of charge being increased until it reaches the reference state of charge. Since the state of charge is kept to the constant charging state reference signal, it is ensured that the energy storage system cannot destabilize and reach a fully charged or discharged state. Signal 904 shows a variation of the state of charge that depends on the power provided by the energy generation system. The behavior is close to the ideal case despite a consideration of the losses. Thereby, the configurable offset defines a minimum charging state. In this case, the minimum charging state is set to 0%. A different value may be used, for instance due to manufacturers recommendations. FIG. 9 also illustrates that the charging state control of curve 904 allows a further reduction of the power reserves of the energy storage system.

The effect of the described charging state controls according to FIGS. 6 and 7 on the energy storage system is analyzed with respect to the parameters shown in table 4. The solution using a model-based charging state reference signal is capable of further reducing the required maximum energy compared to the solution using a constant charging state reference signal.

TABLE 2

Evaluation of required energy of model-based (mb) and non-model-based (nmb) charging state control

|  | Emax[kWh] | Pmax[kW] | Eac[kWh] |
| --- | --- | --- | --- |
| ideal | 6.1 | 725.4 | 505.4 |
| nmb | 18.8 | 802.1 | 513.4 |
| mb | 6.2 | 721.2 | 511.9 |

The maximum power and accumulated energy are also further reduced for the disclosed solution of a model-based charging state control compared to the non-model-based charging state control. The reduced stresses thereof positively affect the energy storage system over the scope of months or years of operation. These reduced stress factors contribute significantly to slowing down the aging process of the energy storage system. Further, the effect of the state of charge regulation on the power variability reduction can be minimized. Using the CDF for 1 second variations, 1 minute variations and 30 minutes variations as outlined above, the results of the evaluation for the application of a model-based and non-model-based charging state control are shown in table 5. The results of the model-based solution are closer to the ideal line than those of the non-model-based solution. Hence, the state of charge control influences the reduction of the power variability (smoothing operation) less when the model-based charging state control is used than when the non-model-based charging control is used. Table 5 shows that the values of the CDFs of the ideal (lossless) system, i.e. table line 'Ps(BSF, ideal)', are close to the values of the CDFs of the system using the model-based charging control, i.e. table line 'Ps(BSF, mb)'. Thus, it can be concluded that the reduction of the power variability (smoothing operation) can be performed in the case of the model-based charging control almost with the same efficiency as in the ideal case and still ensures that the state of charge cannot drift.

TABLE 5

|  | CDF_1 sec[MW/s] | CDF_1 min[MW/s] | CDF_30 min[MW/s] |
| --- | --- | --- | --- |
| Ps | 0.2558 | 0.535 | 0.6094 |
| Ps(BSF, ideal) | 0.1719 | 0.2277 | 0.4876 |
| Ps(BSF, nmb) | 0.1717 | 0.2309 | 0.4994 |
| Ps(BSF, mb) | 0.1719 | 0.2287 | 0.4873 |

Considering table 5, it can further be seen that the proposed solution of using a model-based charging state control ensures a stable SOC operation while minimizing the effect on smoothing operations and uses approximately the energy required in the ideal case. Accordingly, the burden on the energy storage system is reduced significantly, which results in reduced power requirements and therefore, a more compact system design is realizable.

The control system 100 may be provided as a separate stand alone control system, or it may for example be integrated into a power plant control system (e.g. wind farm controller) that operates the energy generation system 100 (e.g. a wind farm). The control system 100 or parts thereof, e.g. the charging state controlling unit 601, may also be implemented in the energy storage system 107. As such, the control system 100 can be a central control system or a distributed control system that is spread across the power plant, and the parts of which communicate by the respective signals.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control system for providing a control signal to an energy storage system to reduce power variability of an energy generation system, wherein the energy storage system is coupled to a power output of the energy generation system and configured to at least one of receive and provide electrical power in response to the control signal, wherein the control system comprises:
   a monitoring unit configured to monitor the power output of the energy generation system and to provide a respective monitoring signal; and
   a control signal generation unit configured to generate the control signal from the monitoring signal, wherein the control signal generation unit implements a filtering unit that has a band pass response, the filtering unit passing a predetermined frequency band of the monitoring signal, the control signal generation unit being configured to generate the control signal in the predetermined frequency band so as to compensate power variations of the power output of the energy generation system in the predetermined frequency band;
   wherein the control signal for compensating the variations is derived only from the monitoring signal in the predetermined frequency band so that the power variations are only compensated in the predetermined frequency band;
   wherein the predetermined frequency band is predetermined such that a probability of an occurrence of a variation in the power output of the energy generation system is below a predetermined threshold, the variation exceeding a predetermined frequency range and/or a predetermined amplitude.

2. The control system according to claim 1, wherein the control system is configured to generate a control signal for compensating the variations only within the predetermined frequency band.

3. The control system according to claim 1, wherein the predetermined frequency band includes a frequency of 0.1 Hz, wherein the predetermined frequency band comprises at least frequencies between 0.01 Hz and 0.03 Hz.

4. The control system according to claim 1, wherein the control system further comprises a charging state controlling unit, wherein the charging state controlling unit generates a charging state control signal provided to the energy storage system to adjust a charging state of the energy storage system in accordance with a charging state reference signal, wherein the control system is configured to adjust the control signal of the control signal generation unit by the charging state control signal.

5. The control system according to claim 4, wherein the charging state controlling unit is configured to derive the charging state reference signal from the monitoring signal under consideration of a transfer function of the filtering unit.

6. The control system according to claim 4, wherein the charging state controlling unit includes a modelled filter that represents at least a model of the charging state of the energy storage system to derive the charging state reference signal.

7. The control system according to claim 4, wherein the charging state control signal is generated based on a model that models the minimum energy variation that is required by the energy storage system to reduce the variations of the power output of the energy generation system.

8. The control system according to claim 4, wherein the charging state controlling unit further comprises a gain unit in order to tune an effect of the charging state controlling unit on the reduction of power variability.

9. The control system according to claim 4, wherein the charging state reference signal comprises a minimum charging state value that ensures that the charging state of the energy storage system is kept to the minimum charging state value.

10. A system configured to reduce power variability of an energy generation system, comprising:
    an energy storage system coupled to a power output of the energy generation system, the energy storage system being configured to at least one of receive and provide electrical power in response to a control signal;
    the control system according to claim 1 coupled to the energy storage system to provide the control signal to the energy storage system to reduce power variability of the energy generation system.

11. A method for providing a control signal to an energy storage system to reduce power variability of an energy generation system, wherein the energy storage system is coupled to a power output of the energy generation system and configured to at least one of receive and provide electrical power in response to the control signal, the method comprising:
    monitoring, by a monitoring unit, the power output of the energy generation system and providing a respective monitoring signal; and
    generating, by a control signal generation unit, the control signal from the monitoring signal, wherein the generating includes at least the use of a filtering unit that has a band pass response, the filtering unit passing a predetermined frequency band of the monitoring signal, wherein the control signal is generated in the predetermined frequency band so as to compensate power variations of the power output of the energy generation system in the predetermined frequency band,
    wherein the control signal for compensating the variations is derived only from the monitoring signal in the predetermined frequency band so that the power variations are only compensated in the predetermined frequency band;
    wherein the predetermined frequency band is predetermined such that a probability of an occurrence of a variation in the power output of the energy generation system is below a predetermined threshold, the variation exceeding a predetermined frequency range and/or a predetermined amplitude.

12. The method according to claim 11, wherein the method further comprises generating, by a charging state controlling unit, a charging state control signal in accordance with the response of a modelled filter and providing the charging state control signal to the energy storage system.

13. The method according to claim 12, wherein the method further comprises adjusting the control signal of the control signal generation unit by the charging state control signal.

14. A computer program product, comprising a computer readable hardware storage device having computer readable program code stored therein, said program code executable by a processor of a control system for providing a reference power signal for an energy storage system to reduce power variability in an energy generation system, wherein the computer program comprises control instructions which, when executed by the processor of the control system coupled to the energy storage system, cause the processor to perform the method according to claim 11.

15. A control system for providing a control signal to an energy storage system to reduce power variability of an energy generation system, wherein the energy storage system is coupled to a power output of the energy generation system and configured to at least one of receive and provide electrical power in response to the control signal, wherein the control system comprises:
 a monitoring unit configured to monitor the power output of the energy generation system and to provide a respective monitoring signal; and
 a control signal generation unit configured to generate the control signal from the monitoring signal, wherein the control signal generation unit implements a filtering unit that has a band pass response, the filtering unit passing a predetermined frequency band of the monitoring signal, the control signal generation unit being configured to generate the control signal in the predetermined frequency band so as to compensate power variations of the power output of the energy generation system in the predetermined frequency band;
wherein the control signal for compensating the variations is derived only from the monitoring signal in the predetermined frequency band so that the power variations are only compensated in the predetermined frequency band;
wherein the control system further comprises a charging state controlling unit, wherein the charging state controlling unit generates a charging state control signal provided to the energy storage system to adjust a charging state of the energy storage system in accordance with a charging state reference signal, wherein the control system is configured to adjust the control signal of the control signal generation unit by the charging state control signal.

* * * * *